(12) United States Patent
Badawiyeh (10) Patent No.: US 10,192,527 B2
(45) Date of Patent: Jan. 29, 2019

(54) USER INTERFACES FOR HAND-HELD ELECTRONIC DEVICES

(71) Applicants: THOMSON LICENSING, Issy-les-Moulineaux (FR); Basil Badawiyeh, Santa Clarita, CA (US)

(72) Inventor: Basil Badawiyeh, Santa Clarita, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 87 days.

(21) Appl. No.: 14/433,982

(22) PCT Filed: Oct. 26, 2012

(86) PCT No.: PCT/US2012/062081
§ 371 (c)(1),
(2) Date: Apr. 7, 2015

(87) PCT Pub. No.: WO2014/065812
PCT Pub. Date: May 1, 2014

(65) Prior Publication Data
US 2015/0221287 A1    Aug. 6, 2015

(51) Int. Cl.
*G09G 5/38* (2006.01)
*G06F 3/023* (2006.01)
*H04M 1/725* (2006.01)
*G06F 1/16* (2006.01)

(52) U.S. Cl.
CPC ............. *G09G 5/38* (2013.01); *G06F 1/1626* (2013.01); *G06F 3/0236* (2013.01); *H04M 1/7258* (2013.01); *G06F 2200/1614* (2013.01); *H04M 2250/12* (2013.01)

(58) Field of Classification Search
CPC ....... G09G 5/38; G06F 1/1626; G06F 3/0236; G06F 2200/1614; H04M 1/7258; H04M 2250/12
See application file for complete search history.

(56) References Cited

U.S. PATENT DOCUMENTS

| | | | |
|---|---|---|---|
| 6,684,087 B1 * | 1/2004 | Yu | ........................ G06T 3/4038 455/414.3 |
| 7,152,806 B1 | 12/2006 | Rosen | |
| 7,401,300 B2 | 7/2008 | Nurmi | |
| 2004/0233173 A1 | 11/2004 | Bryant | |
| 2006/0176278 A1 * | 8/2006 | Mathews | ................. G09G 3/20 345/168 |

(Continued)

FOREIGN PATENT DOCUMENTS

WO       2007096688       8/2007

*Primary Examiner* — Abderrahim Merouan
(74) *Attorney, Agent, or Firm* — Meagher Emanuel Laks Goldberg & Liao, LLP (57) ABSTRACT

User interfaces for hand-held electronic devices, such as mobile telephone devices, touch tablets, personal computers (PC), remote control devices, and/or other devices, assist users with, among other things, knowing which user input elements of a device to use when the device's physical orientation changes. According to an exemplary embodiment, a hand-held device is operative to be held in normal, upside down, left tilt, and right tilt orientations. The hand-held device changes the functions corresponding to ones of a plurality of physical buttons and ones of a plurality of virtual buttons based on the device orientation.

22 Claims, 6 Drawing Sheets

(56) References Cited

U.S. PATENT DOCUMENTS

| | | |
|---|---|---|
| 2007/0252853 A1 | 11/2007 | Park et al. |
| 2007/0259685 A1* | 11/2007 | Engblom .............. G06F 1/1626 |
| | | 455/550.1 |
| 2009/0066654 A1 | 3/2009 | Wang et al. |
| 2009/0102796 A1* | 4/2009 | Harris ................... G06F 1/1626 |
| | | 345/168 |
| 2009/0179854 A1 | 7/2009 | Weber et al. |
| 2010/0053089 A1 | 3/2010 | Kwok et al. |
| 2010/0053218 A1* | 3/2010 | Risher-Kelly ....... A61B 5/0002 |
| | | 345/649 |
| 2010/0156939 A1 | 6/2010 | Lee |
| 2011/0087963 A1 | 4/2011 | Brisebois et al. |
| 2011/0167375 A1* | 7/2011 | Kocienda .............. G06F 1/3203 |
| | | 715/773 |

\* cited by examiner

USER INTERFACES FOR HAND-HELD ELECTRONIC DEVICES

This application claims the benefit, under 35 U.S.C. § 365 of International Application PCT/US2012/062081 filed Oct 26, 2012 which was published in accordance with PCT Article 21(2) on May 1, 2014 in English.

BACKGROUND OF THE INVENTION

Field of the Invention

The present invention generally relates to user interfaces for hand-held electronic devices, such as mobile telephone devices, touch tablets, personal computers (PC), remote control devices, and/or other devices, and more particularly, to user interfaces for such devices that assist users with, among other things, knowing which user input elements of a device to use when the device's physical orientation changes.

Background Information

Hand-held electronic devices, such as mobile telephone devices, touch tablets, personal computers (PC), remote control devices, and/or other devices have the capability of being physically re-orientated (e.g., flipped upside down, switched between a landscape orientation and a portrait orientation, etc.).

One problem associated with such devices is that a user may have a difficult time determining which user input elements (e.g., buttons, keys, etc.) of a device to use after the device's physical orientation changes. For example, if a device can be operatively held in different orientations, such as normal, upside down, left tilt and right tilt orientations, but the physical buttons/keys of the device are designed for use in the normal orientation, it may be difficult for users to determine which physical buttons/keys to use when the device is positioned in orientations other than the normal orientation.

Accordingly, there is a need in the art to address the foregoing issues, and thereby provide improved user interfaces for hand-held electronic devices that assist users with, among other things, knowing which user input elements of a device to use when the device's physical orientation changes. The present invention described herein addresses these and/or other issues.

SUMMARY OF THE INVENTION

In accordance with an aspect of the present invention, a hand-held device is disclosed. According to an exemplary embodiment, the hand-held device is operative to be held in normal, upside down, left tilt, and right tilt orientations, and comprises processing means such as a processor and display means such as a display. A first physical button is located on a first side of the display when the hand-held device is held in the normal orientation. A second physical button is located on a second side of the display opposite to the first side. The second physical button is positioned diagonally symmetrical to the first physical button when the hand-held device is held in the normal orientation. Also according to an exemplary embodiment, activation of the first and second physical buttons respectively causes the processor to perform first and second functions when the hand-held device is held in the normal orientation, and respectively causes the processor to perform the second and first functions when the hand-held device is held in the upside down orientation. When the hand-held device is held in one of the left tilt and right tilt orientations, the processor causes display of first and second virtual buttons via the display, and activation of the first and second virtual buttons respectively causes the processor to perform the first and second functions. The first and second virtual buttons are respectively displayed in respective positions in the display in the one of the left tilt and right tilt orientations respectively corresponding to positions of the first and second physical buttons when the hand-held device is held in the normal orientation.

In accordance with another aspect of the present invention, a method for operating a device operative to be held in normal, upside down, left tilt, and right tilt orientations is disclosed. According to an exemplary embodiment, the method comprises: performing first and second functions in response to activation of first and second physical buttons, respectively, when the device is held in the normal orientation, wherein the first physical button is located on a first side of a display of the device when the device is held in the normal orientation, and the second physical button is located on a second side of the display opposite to the first side, the second physical button being positioned diagonally symmetrical to the first physical button when the device is held in the normal orientation; performing the second and first functions in response to activation of the first and second physical buttons, respectively, when the device is held in the upside down orientation; enabling display of first and second virtual buttons via the display when the device is held in one of the left tilt and right tilt orientations; performing the first and second functions in response to activation of the first and second virtual buttons, respectively, when the device is held in one of the left tilt and right tilt orientations; and wherein: the first and second virtual buttons are respectively displayed in respective positions in the display in the one of the left tilt and right tilt orientations respectively corresponding to positions of the first and second physical buttons when the device is held in the normal orientation.

The aforementioned brief summary of exemplary embodiments of the present invention is merely illustrative of the inventive concepts presented herein, and is not intended to limit the scope of the present invention in any manner.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner. For clarity of description, the same reference numbers may be used throughout the following description to represent the same or similar elements of the drawing figures.

DESCRIPTION OF THE PREFERRED EMBODIMENTS

Figure 1:
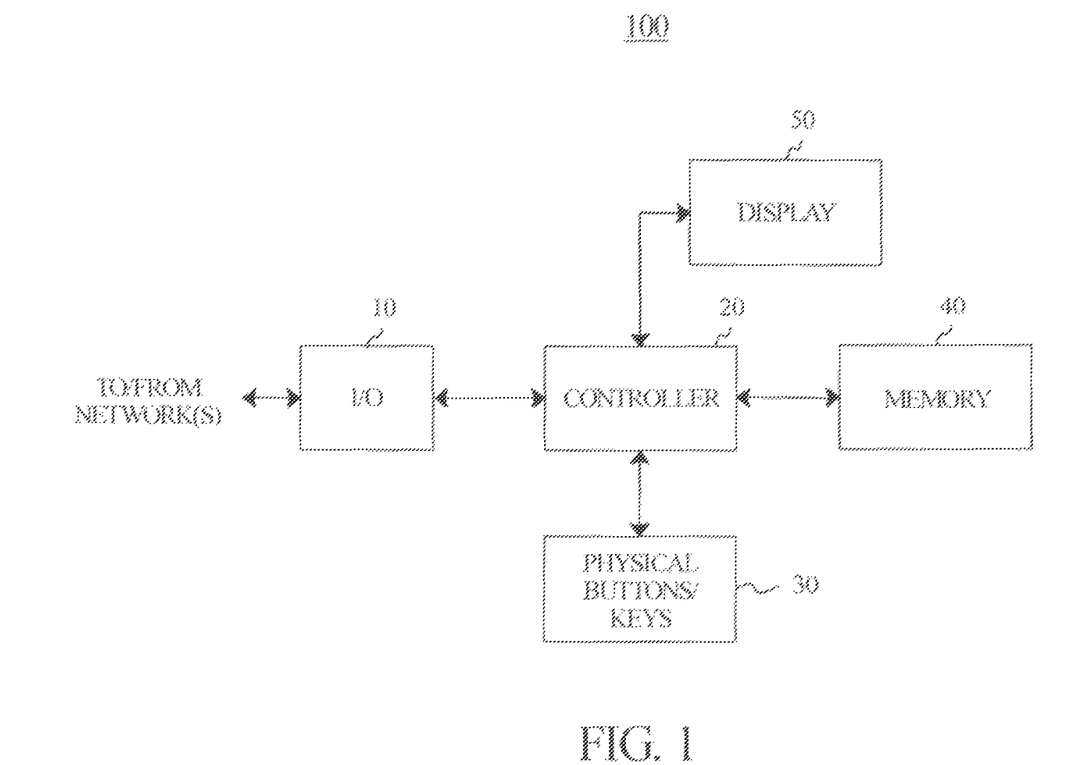
FIG. 1 shows a block diagram of relevant portions of a device suitable for implementing exemplary embodiments of the present invention.

Referring now to the drawings, and more particularly to FIG. 1, a block diagram showing relevant portions of a user device 100 suitable for implementing exemplary embodiments of the present invention is illustrated. According to an exemplary embodiment, user device 100 is embodied as a hand-held device (e.g., mobile telephone device, touch tablet, personal computer (PC), slate, remote control device, etc.) and/or other type of device.

As indicated in FIG. 1, user device 100 comprises input/output (I/O) means such as I/O block 10, control and processing means such as controller 20, user input means such as physical buttons/keys block 30, data storage means such as memory 40, and display means such as display 50. Some of the foregoing elements of FIG. 1 may be embodied using one or more integrated circuits (ICs). For clarity of description, certain conventional elements associated with user device 100 such as certain control signals, power signals, and/or other elements may not be shown in FIG. 1.

I/O block 10 is operative to perform I/O functions of user device 100. According to an exemplary embodiment, I/O block 10 is operative to receive signals such as audio, video and/or data signals in analog and/or digital modulation format(s) in a wired and/or wireless manner from one or more networks such as terrestrial, cable, satellite, internet and/or other network sources, and to output signals in a wired and/or wireless manner to such one or more networks. I/O block 10 may be embodied as any type of I/O interface capable of receiving wired and/or wireless signals, and may be comprised of one or more individual components (e.g., antenna(s), plug(s), etc.).

Controller 20 is operative to perform various signal processing and control functions (e.g., execute software code, etc.) of user device 100 that facilitates and enables performance of the various embodiments and techniques of the present invention described herein.

According to an exemplary embodiment, controller 20 receives the signals provided from I/O block 10 and performs and/or enables all necessary processing and control functions associated with user device 100 via one or more microprocessors and/or other element(s). For example, controller 20 is operative to process audio, video and/or data signals provided from I/O block 10 by performing functions including tuning, demodulation, forward error correction, and transport processing functions to thereby generate digital data representing audio, video and/or data content. The digital data produced from such processing functions may be provided for further processing and/or output (e.g., via display 50).

Also according to exemplary embodiments, controller 20 is operative to perform and/or enable various other functions including, but not limited to, processing user inputs made via physical buttons/keys block 30, controlling functions (e.g., volume and channel control functions, etc.) of user device 10 in response to user inputs, reading and writing data from and to memory 40, enabling on-screen displays (e.g., video, virtual buttons/keys, menus, etc.) via display 50, and/or other operations as may be described herein. Also according to exemplary embodiments, controller 20 includes means, such as an accelerometer, gyroscopic sensor and/or other element(s) for detecting the motion and physical orientation of user device 10.

Physical buttons/keys block 30 is operative to receive physical user inputs from a user operator of user device 100. According to an exemplary embodiment, physical buttons/keys block 30 comprises a plurality of physical buttons and/or keys that are arranged in a symmetrical and/or other suitable manner around display 50, and may for example, be configured within and extend from a housing of user device 10. Other types of inputs may also be provided via block 30. Inputs provided via block 30 are provided to controller 20 for processing.

Memory 40 is operatively coupled to controller 20 and performs data storage functions of user device 100. According to an exemplary embodiment, memory 40 stores data including, but not limited to, software code and other data associated with one or more computer applications including those described herein, on-screen display data (e.g., virtual buttons/keys, menus, browsers, etc.), user selection/setup data, and/or other data.

Display 50 is operative to provide visual displays including video content pursuant to the control of controller 20. According to an exemplary embodiment, display 50 is operative to provide touch-screen capabilities including virtual buttons/keys, and thereby enables a user operator to provide inputs (separate from those provided via physical buttons/keys block 30) that are received and processed by controller 20. Display 50 may be embodied using any type of suitable display device, such as a light emitting diode (LED) display, liquid crystal display (LCD), or other type of display device.

Although not expressly shown in FIG. 1, display 50 also includes associated aural output means, such as speakers and/or other audio output element(s), the volume of which may be controlled by, for example, the aforementioned physical buttons/keys block 30 and virtual buttons/keys of display 50.

Referring now to FIGS. 2-9, a device 100 positioned in different physical orientations according to different exemplary embodiments of the present invention is shown. As indicated in FIGS. 2-9, physical buttons/keys block 30 of FIG. 1 may be embodied using physical buttons/keys 30a-30d (also respectively labeled as buttons/keys 1-4 in FIGS. 2-9).

Figure 2:
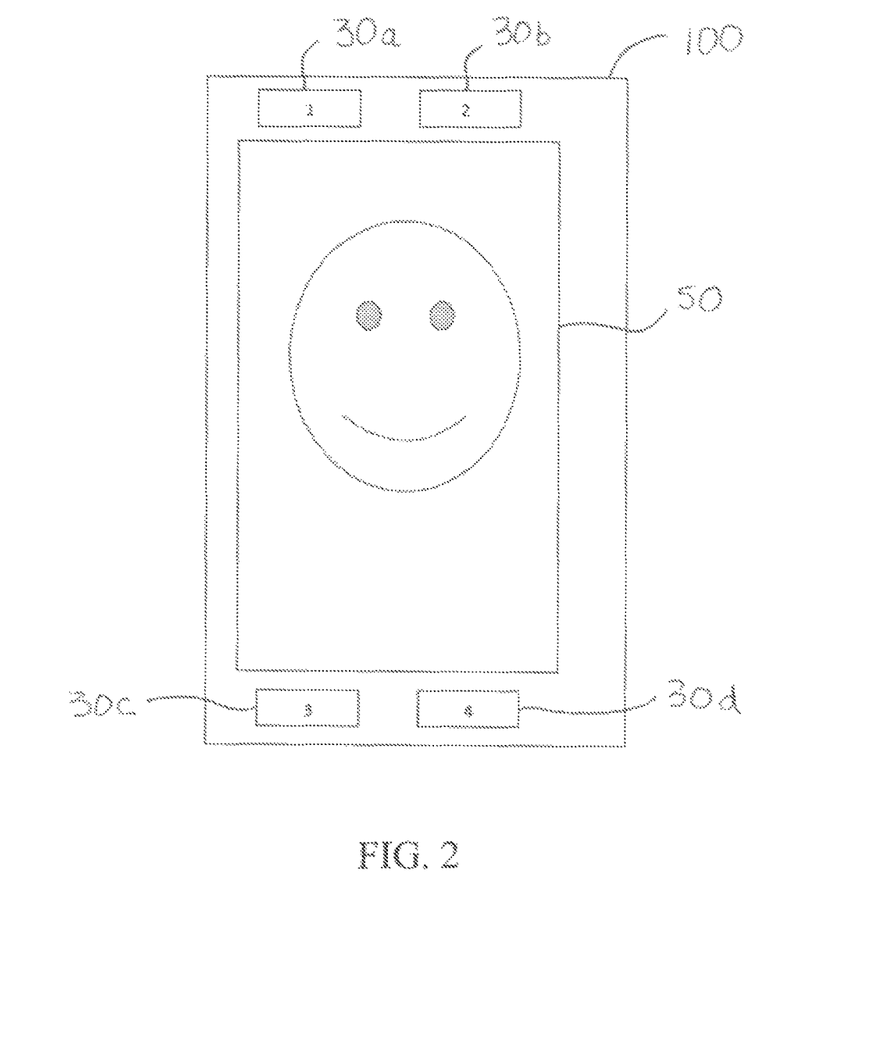
FIG. 2 shows a device in a normal orientation according to an exemplary embodiment of the present invention.

FIG. 2 shows a device 100 in a normal orientation according to an exemplary embodiment of the present invention. Specifically, device 100 is positioned in a portrait orientation in FIG. 2.

According to an exemplary embodiment, device 100 of FIG. 2 is used to view video programming where certain buttons thereof (30a and 30c) are used to adjust the volume of the program and other buttons (30b and 30d) are used to change between the channels that are used for broadcasting programming. An exemplary representation of the functions assigned to buttons 30a-30d in FIG. 2 is shown below:

| Button Number | Function |
| --- | --- |
| 1 | Raise Volume |
| 2 | Channel Up |
| 3 | Lower Volume |
| 4 | Channel Down |

Figure 3:
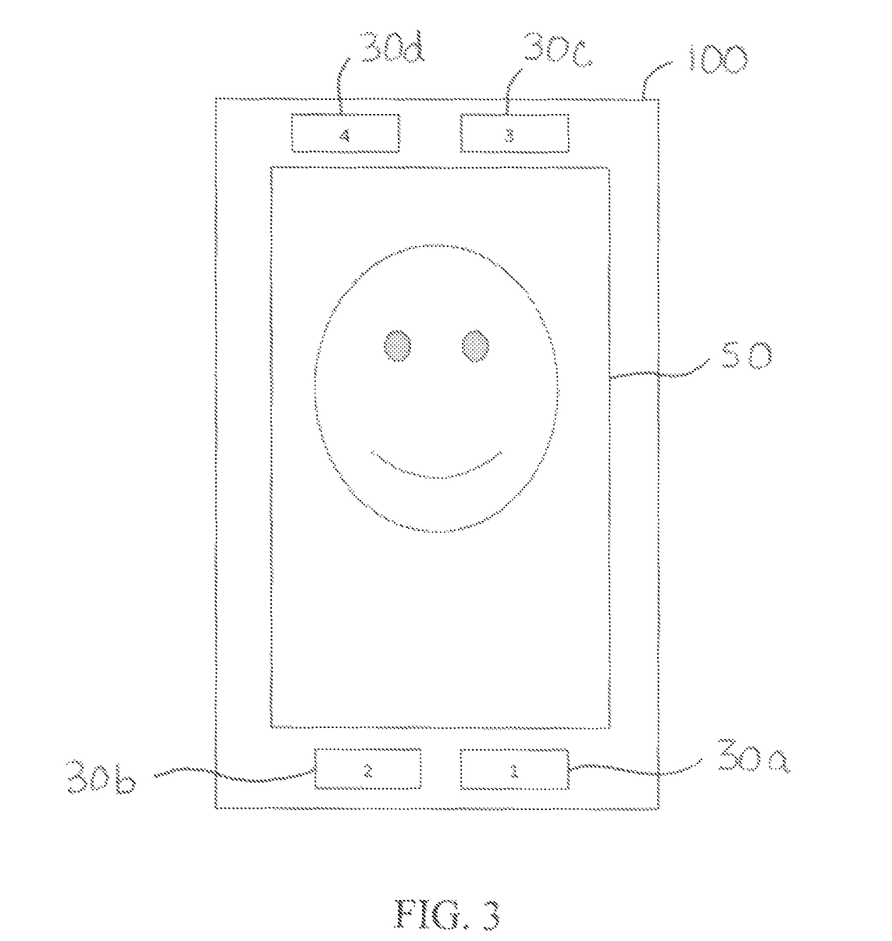
FIG. 3 shows a device in an upside down orientation according to an exemplary embodiment of the present invention.

If a user flips device 100 of FIG. 2 upside down as shown in FIG. 3 (which is also a portrait orientation), controller 20 of device 100 detects this change in physical orientation and causes the video content (e.g., smiley face, etc.) presented in display 50 to be adjusted accordingly (i.e., flipped upside down). Also according to principles of the present invention, the function of physical buttons/keys 30a-30d is adjusted accordingly in response to device 100 being flipped upside down. Otherwise, a user may have difficultly using device 100 because the current configuration of physical buttons/keys 30a-30d would be reversed, and hence awkward to the user. Accordingly, once controller 20 detects that device 100 has been flipped upside down (i.e., rotated 180 degrees from the normal orientation) as shown in FIG. 3, controller 20 also changes the functions assigned to physical buttons/keys 30a-30d, as shown below:

| Button Number | Function |
| --- | --- |
| 4 | Raise Volume |
| 3 | Channel Up |
| 2 | Lower Volume |
| 1 | Channel Down |

As indicated above, when device 100 is switched from a normal orientation to an upside down orientation, as reflected in FIGS. 2 and 3, controller 20 causes the video content (e.g., smiley face, etc.) presented in display 50 to be adjusted accordingly (i.e., flipped upside down), and also causes the functionality of physical buttons/keys 30a-30d to be remapped in a user-friendly manner.

Figure 4:
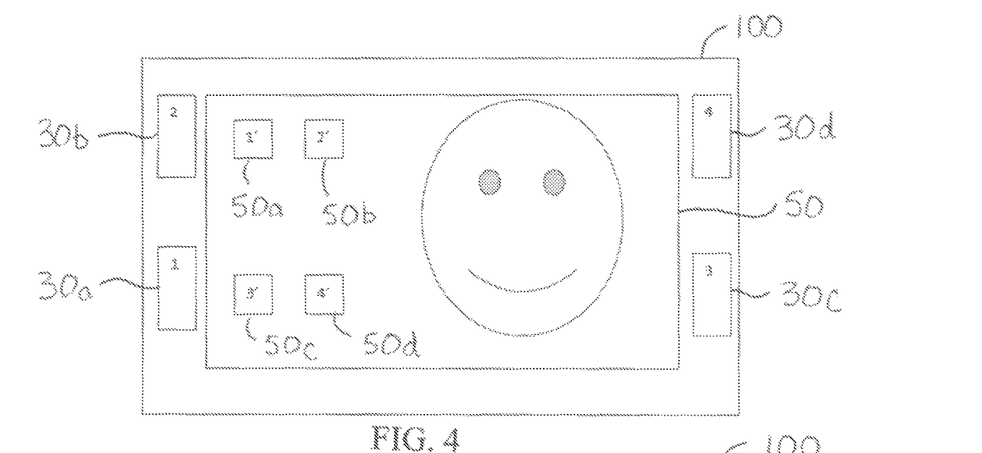
FIG. 4 shows a device in a left tilt orientation according to an exemplary embodiment of the present invention.

FIG. 4 shows device 100 in a left tilt or right tilt orientation according to an exemplary embodiment of the present invention. According to principles of the present invention, the left tilt and right tilt orientations each corresponds to a landscape orientation. The physical orientation of device 100 shown in FIG. 4 may be obtained by a user rotating device 100 from the normal orientation (see FIG. 2) to the left by 90 degrees (i.e., left tilt), and/or by the user rotating device 100 from the upside down orientation (see FIG. 3) to the right by 90 degrees (i.e., right tilt). However, the right tilt and left tilt orientations in this specification are defined with to the normal orientation. If device 100 is positioned more than 45 degrees or less than 135 degrees counterclockwise with respect to the normal orientation, device 100 is considered to be in left tilt orientation and if device 100 is positioned more than 45 degrees or less than 135 degrees clockwise with respect to the normal orientation, device 100 is considered to be in right tilt orientation In FIG. 4, instead of having a user rely on purely a remapping of physical buttons/keys 30a-30d, virtual buttons/keys 50a-50d are provided in a touch screen area of display 50 and can be touched by a user to adjust the functions of device 100. According to an exemplary embodiment, controller 20 causes virtual buttons/keys 50a-50d to be displayed via display 50 in response to detecting that device 100 has been switched to either one of the left tilt and right tilt orientations, as shown for example in FIG. 4.

Also according to exemplary embodiments, the area of display 50 dedicated to a video presentation can optionally be scaled down in order to make room for virtual buttons/keys 50a-50d, and/or virtual buttons/keys 50a-50d may each be labeled with a legend (e.g., text, symbol, etc.) indicative of its associated function. Further details of these exemplary features may be referenced later herein.

Figure 5:
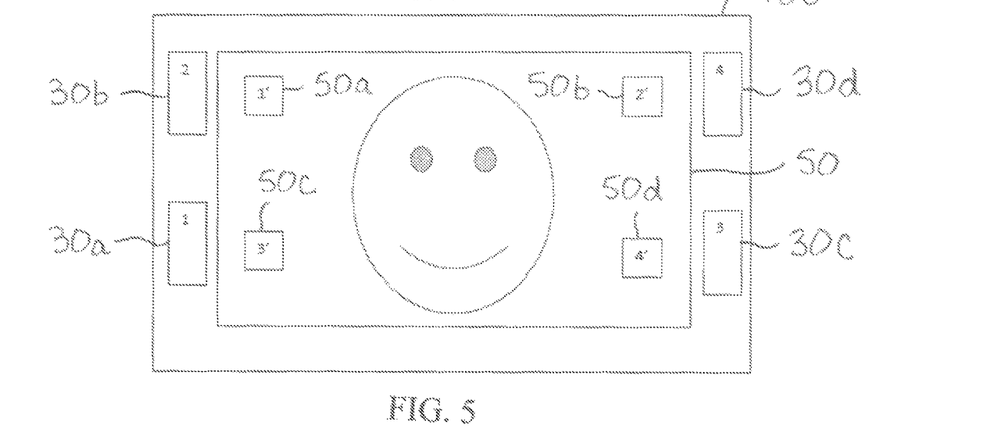
FIG. 5 shows a device in a left tilt orientation according to another exemplary embodiment of the present invention.
Figure 6:
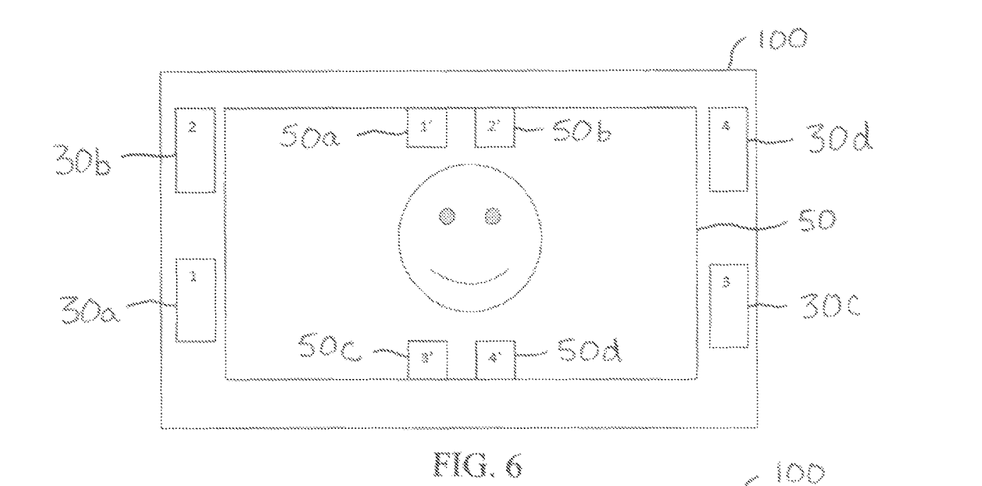
FIG. 6 shows a device in a left tilt orientation according to still another exemplary embodiment of the present invention.

According to exemplary embodiments, virtual buttons/keys 50a-50d in FIGS. 4-6, when pressed, perform the following functions:

| Button Number | Function |
| --- | --- |
| 1' | Raise Volume |
| 2' | Channel Up |
| 3' | Lower Volume |
| 4' | Channel Down |

For purposes of example and explanation, the position of virtual buttons/keys 50a-50d is shown in FIG. 4 on the left side of display 50. However, such virtual buttons/keys 50a-50d can also be positioned in other configurations, such as on the right side, top and/or bottom of display 50.

Figure 7:
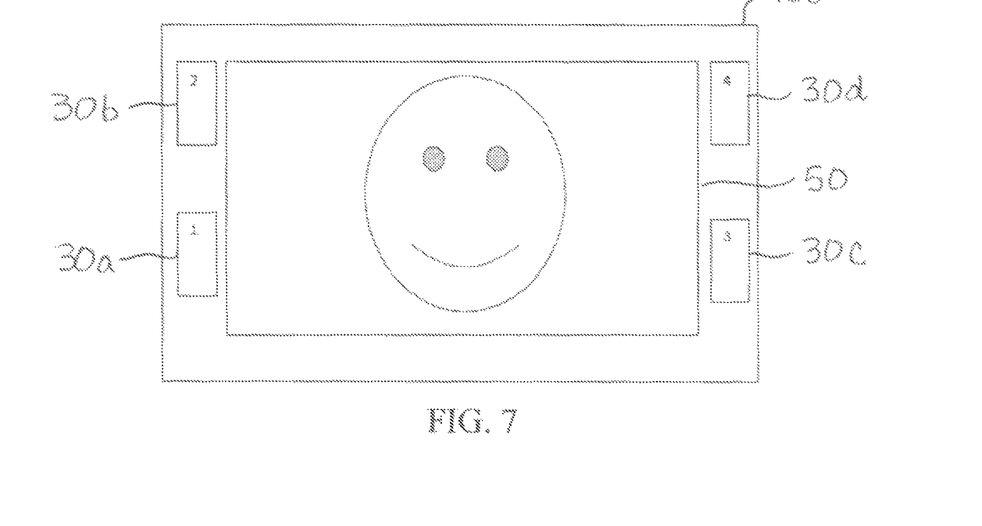
FIG. 7 shows a device in a left tilt orientation according to yet another exemplary embodiment of the present invention.

FIG. 5 shows another configuration for display 50 where virtual buttons/keys 50a-50d surround the video image being viewed. FIG. 6 shows still another configuration for display 50 where virtual buttons/keys 50a-50d are positioned in relatively close proximity to the image being viewed. In this exemplary embodiment, the visual image (e.g., smiley face, etc.) is also scaled down in size and/or resolution to accommodate the positioning of virtual buttons/keys 50a-50d. The use of physical buttons/keys 30a-30d in FIGS. 4-6 may be optional and/or redundant to the use of virtual buttons/keys 50a-50d. FIG. 7 shows yet another exemplary configuration for display 50 that does not include any virtual buttons/keys.

FIGS. 4-7 show that device 100 is in the left tilt orientation. If device 100 is in right tilt orientation, the right top and bottom physical buttons are physical buttons 30a and 30b, respectively, and the left top and bottom physical buttons are physical buttons 30c and 30d, respectively. However, the virtual buttons 50a, 50b, 50c, and 50d are visually positioned in the same ways as shown in FIGS. 4-6. In effect, a user uses a virtual button located in the same position in either the left tilt or right tilt orientation to perform the same function.

Furthermore, in the case that no virtual button is displayed in the right tilt or left tilt orientation, the physical buttons on the left and right sides are assigned the same functions regardless of whether device 100 is in right tilt or left tilt orientation. For example, the right top and bottom physical buttons are always assigned the functions of the physical buttons 30d and 30c, respectively, when device 100 is in the normal orientation, and the left top and bottom physical buttons are always assigned the functions of the physical buttons 30b and 30a, respectively, when device 100 is in the normal orientation. In another embodiment, the right top and bottom physical buttons are always assigned the functions of the physical buttons 30a and 30b, respectively, when device 100 is in the normal orientation, and the left top and bottom physical buttons are always assigned the functions of the physical buttons 30c and 30d, respectively, when device 100 is in the normal orientation. In yet another embodiment, device 100 allows a user to assign the functions of the physical buttons when device 100 is in left tilt and right tilt orientations.

Figure 8:
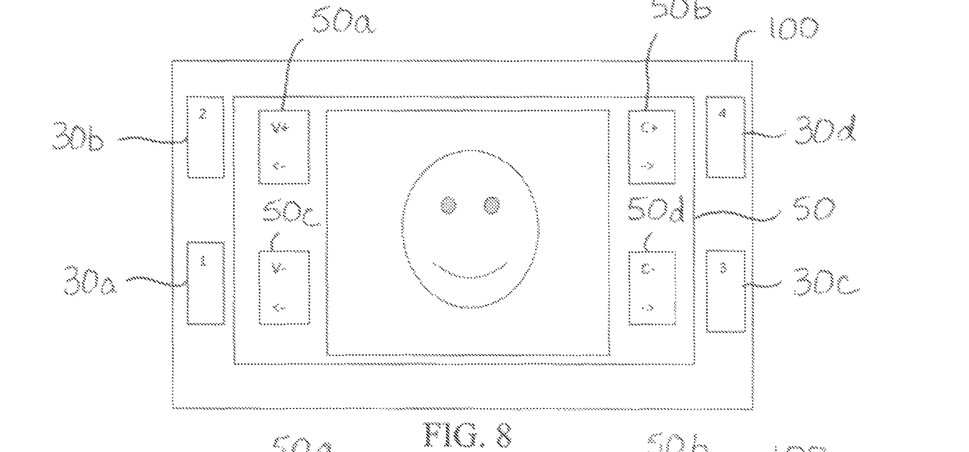
FIG. 8 shows a device in a left tilt or right tilt orientation according to still yet another exemplary embodiment of the present invention.
Figure 9:
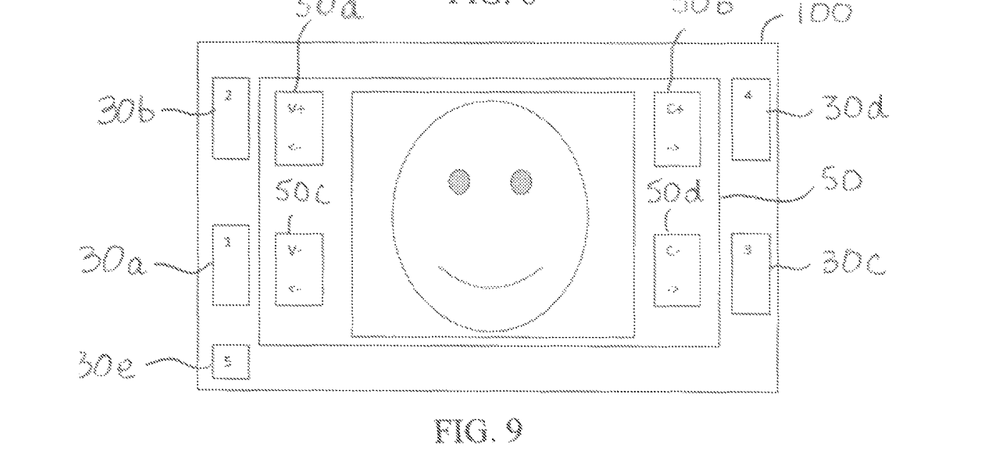
FIG. 9 shows a device in a left tilt or right tilt orientation according to still yet a further exemplary embodiment of the present invention.

FIGS. 8 and 9 show further exemplary embodiments of device 100 in a left tilt or right tilt (landscape) orientation where virtual buttons/keys 50a-50d are each labeled to show the respective functions of physical buttons/keys 30a-30d that surround virtual buttons/keys 50a-50d. These exemplary embodiments can be used even if display 50 does not include touch screen capabilities. In such embodiments, virtual buttons/keys 50a-50d would simply be visual indicators rather than executable buttons/keys. Display options for virtual buttons/keys 50a-50d may be designated, for example, by a user during a user set-up process for device 100. Configurations for physical buttons/keys 30a-30d and/or virtual buttons/keys 50a-50d other than those expressly shown and described herein may also be employed according to principles of the present invention.

As shown in FIGS. 8 and 9, virtual buttons/keys 50a-50d each includes some type of label or legend, which indicates the particular function performed by that particular virtual button/key 50a-50d as a touch screen element and/or indicates to the user the direction (e.g., "<–", "–>", etc.) of physical button/key 30a-30d that performs the same or similar respective function. According to an exemplary embodiment, virtual buttons/keys 50a-50d in FIGS. 8 and 9, when pressed, perform the following functions:

| Virtual Button Label | Function |
|---|---|
| V+ | Raise Volume |
| C+ | Channel Up |
| V– | Lower Volume |
| C– | Channel Down |

FIG. 9 shows still yet another example of device 100 in a left tilt or right tilt (landscape) orientation. Specifically, the exemplary embodiment of FIG. 9 includes a physical button/key 30e (i.e., button "5") that can be activated by a user to present a help mode of device 100. During this mode, controller 20 of device 100 may, for example, enable a display listing the functions of various virtual buttons/keys 50a-50d based on the labels that are currently presented via display 50 and/or provide other related functions.

Various other techniques for activating the help mode of device 100 and/or causing the display of virtual buttons/keys 50a-50d via display 50 may be employed according to the present invention. For example, controller 20 may automatically activate the help mode of device 100 and/or cause virtual buttons/keys 50a-50d to be displayed via display 50 in response to device 100 being shaken and/or upon a detected expiration of a predetermined time period after device 100 is turned on.

As described above, the present invention provides desirable user interfaces for hand-held electronic devices, such as mobile telephone devices, touch tablets, personal computers (PC), remote control devices, and/or other devices that advantageously assist users with, among other things, knowing which user input elements of a device to use when the device's physical orientation changes.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A hand-held device operative to be held in normal, upside down, left tilt, and right tilt orientations, said hand-held device comprising:
   a processor;
   a display;
   a first physical button located on a first side of said display when said hand-held device is held in said normal orientation;
   a second physical button located on a second side of said display opposite to said first side, said second physical button positioned diagonally to said first physical button when said hand-held device is held in said normal orientation; and wherein:
   activation of said first and second physical buttons respectively causes said processor to perform first and second functions when said hand-held device is held in said normal orientation, and respectively causes said processor to perform said second and first functions when said hand-held device is held in said upside down orientation;
   when said hand-held device is detected to be held in one of said left tilt and right tilt orientations, said processor causes display of first and second virtual buttons via said display, and touch activation of said first and second virtual buttons respectively causes said processor to perform said first and second functions;
   said first and second virtual buttons are respectively displayed in respective positions in said display in said one of said left tilt and right tilt orientations respectively corresponding to positions and said first and second functions of said first and second physical buttons when said hand-held device is held in said normal orientation; and wherein
   said first and second virtual buttons are only displayed when said hand-held device is detected to be in one of said left tilt and right tilt orientations, and are not displayed when said hand-held device is detected to be in one of said normal orientation and said upside down orientation.

2. The hand-held device of claim 1, wherein:
   said normal and upside down orientations each corresponds to a portrait orientation; and
   said left tilt and right tilt orientations each corresponds to a landscape orientation.

3. The hand-held device of claim 1, wherein:
   said first function corresponds to a volume control function; and
   said second function corresponds to a channel control function.

4. The hand-held device of claim 1, wherein said processor is further operative to reduce a size of a visual image provided via said display when said first and second virtual buttons are displayed.

5. The hand-held device of claim 1, wherein said processor causes said first and second virtual buttons to be displayed in response to said hand-held device being switched from one of said normal and upside down orientations to one of said left tilt and right tilt orientations.

6. The hand-held device of claim 1, wherein said processor causes said first and second virtual buttons to be displayed in response to at least one of: (i) said hand-held device being shaken, and (ii) expiration of a predetermined time period after said hand-held device is turned on.

7. The hand-held device of claim 1, wherein said first and second virtual buttons each includes a label corresponding to one of said first and second functions.

8. A hand-held device operative to be held in normal, upside down, left tilt, and right tilt orientations, said hand-held device comprising:
processing means for processing user inputs to said hand-held device and enabling visual displays;
display means for providing said visual displays;
a first physical button located on a first side of said display means when said hand-held device is held in said normal orientation;
a second physical button located on a second side of said display means opposite to said first side, said second physical button positioned diagonally to said first physical button when said hand-held device is held in said normal orientation; and wherein:
activation of said first and second physical buttons respectively causes said processing means to perform first and second functions when said hand-held device is held in said normal orientation, and respectively causes said processing means to perform said second and first functions when said hand-held device is held in said upside down orientation;
only when said hand-held device is detected to be held in one of said left tilt and right tilt orientations, said processing means causes display, via said display means, of first and second virtual buttons for respectively performing said first and second functions, and touch activation of said first and second virtual buttons respectively causes said processing means to perform said first and second functions; and
said first and second virtual buttons are respectively displayed in respective positions in said display means in said one of said left tilt and right tilt orientations respectively corresponding to positions and said first and second functions_of said first and second physical buttons when said hand-held device is held in said normal orientation; and wherein
said first and second virtual buttons are only displayed when said hand-held device is detected to be in one of said left tilt and right tilt orientations, and are not displayed when said hand-held device is detected to be in one of said normal orientation and said upside down orientation.

9. The hand-held device of claim 8, wherein:
said normal and upside down orientations each corresponds to a portrait orientation; and
said left tilt and right tilt orientations each corresponds to a landscape orientation.

10. The hand-held device of claim 8, wherein:
said first function corresponds to a volume control function; and
said second function corresponds to a channel control function.

11. The hand-held device of claim 8, wherein said processing means is further operative to reduce a size of a visual image provided via said display means when said first and second virtual buttons are displayed.

12. The hand-held device of claim 8, wherein said processing means causes said first and second virtual buttons to be displayed in response to said hand-held device being switched from one of said normal and upside down orientations to one of said left tilt and right tilt orientations.

13. The hand-held device of claim 8, wherein said processing means causes said first and second virtual buttons to be displayed in response to at least one of: (i) said hand-held device being shaken, and (ii) expiration of a predetermined time period after said hand-held device is turned on.

14. The hand-held device of claim 8, wherein said first and second virtual buttons each includes a label corresponding to one of said first and second functions.

15. A method for operating a device operative to be held in normal, upside down, left tilt, and right tilt orientations, said method comprising:
performing first and second functions in response to activation of first and second physical buttons, respectively, when said device is held in said normal orientation, wherein said first physical button is located on a first side of a display of said device when said device is held in said normal orientation, and said second physical button is located on a second side of said display opposite to said first side, said second physical button being positioned diagonally to said first physical button when said device is held in said normal orientation;
performing said second and first functions in response to activation of said first and second physical buttons, respectively, when said device is held in said upside down orientation;
enabling display of first and second virtual buttons via said display only when said device is detected to be held in one of said left tilt and right tilt orientations;
performing said first and second functions in response to touch activation of said first and second virtual buttons, respectively, when said device is held in one of said left tilt and right tilt orientations; and wherein:
said first and second virtual buttons are respectively displayed in respective positions in said display in said one of said left tilt and right tilt orientations respectively corresponding to positions and said first and second functions of said first and second physical buttons when said device is held in said normal orientation; and wherein said first and second virtual buttons are only displayed when said hand-held device is detected to be in one of said left tilt and right tilt orientations, and are not displayed when said hand-held device is detected to be in one of said normal orientation and said upside down orientation.

16. The method of claim 15, wherein:
said normal and upside down orientations each corresponds to a portrait orientation; and
said left tilt and right tilt orientations each corresponds to a landscape orientation.

17. The method of claim 15, wherein:
said first function corresponds to a volume control function; and
said second function corresponds to a channel control function.

18. The method of claim 15, further comprised of reducing a size of a visual image provided via said display when said first and second virtual buttons are displayed.

19. The method of claim 15, wherein said first and second virtual buttons are displayed in response to said device being switched from one of said normal and upside down orientations to one of said left tilt and right tilt orientations.

20. The method of claim 15, wherein said first and second virtual buttons are displayed in response to at least one of: (i) said hand-held device being shaken, and (ii) expiration of a predetermined time period after said device is turned on.

21. The method of claim 15, wherein said first and second virtual buttons each includes a label corresponding to one of said first and second functions.

22. A non-transitory computer program storage medium comprising instructions for performing the method of claim 15 when executed by one of more processors.

\* \* \* \* \*